Feb. 9, 1932.                 G. R. EATON                 1,844,502
                          POWER SUPPLY CIRCUIT
                           Filed Feb. 11, 1929
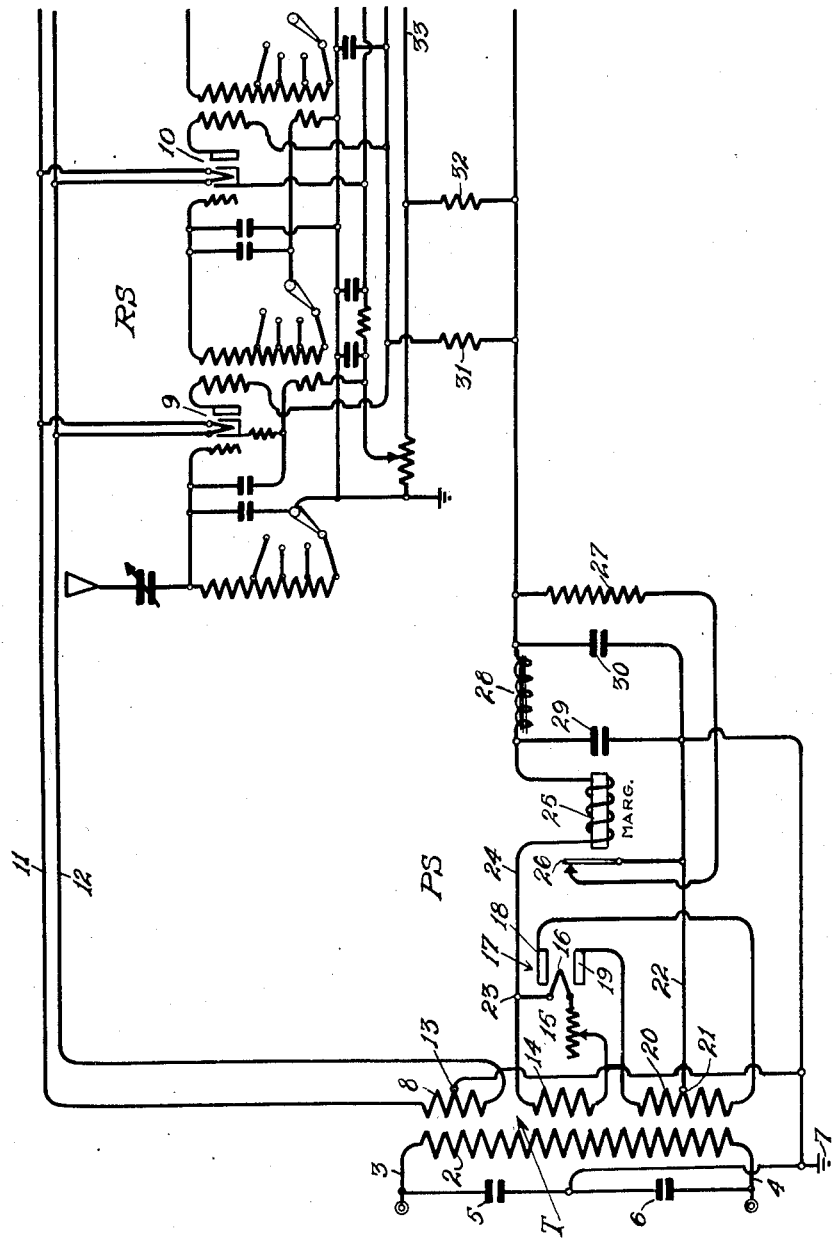
Inventor:
George R. Eaton
By G. A. Yanushowski
Attorney.

Patented Feb. 9, 1932

1,844,502

UNITED STATES PATENT OFFICE

GEORGE R. EATON, OF OAK PARK, ILLINOIS, ASSIGNOR TO KELLOGG SWITCHBOARD AND SUPPLY COMPANY, OF CHICAGO, ILLINOIS, A CORPORATION OF ILLINOIS

POWER SUPPLY CIRCUIT

Application filed February 11, 1929. Serial No. 339,042.

My invention relates to power control devices and more particularly to the type known as voltage control relays which operate when the current passing through the same reaches a predetermined value, and an object of my invention is to associate a relay of this type with a power supply unit such as is used in connection with a radio receiving circuit of the type equipped with heater type tubes to safeguard the apparatus of the power supply unit and the receiving circuit equipment during the time that the tubes are being heated to their normal operating temperature.

Another object of my invention is to provide a power supply device for use with an audion tube, which power supply device is so arranged that when current is connected thereto it supplies cathode current and anode current to the audion tube, but the anode current is maintained at a voltage below the normal open circuit voltage for a certain period of time, and is then kept at normal operating voltage by the flow of plate current across the elements of the tubes.

Another object of my invention is to associate a voltage control relay with a load resistance which is bridged across the plate current supply leads of the supply unit through a normally closed contact of the control relay for limiting the voltage of the current delivered by the supply unit during the time that the heater elements of the audion tubes associated with the receiving circuit, with which the supply unit is associated, are being heated to their normal operating temperature to protect the apparatus of the supply unit and receiving circuit equipment during this interval.

A still further object of my invention is to associate a control relay with the plate current supply of the supply unit so that after heater elements of the audion tubes have heated to the point where sufficient plate current flows from the plate to the cathode the control relay will operate to remove the load resistance from the current supply leads of the supply unit and permit current at the normal operating voltage to be delivered by the supply unit to the plate of the tube.

For a more complete understanding of my invention reference may be had to the accompanying drawing in which I illustrate diagrammatically a power supply unit in association with a voltage control relay and load resistance controlled thereby operatively connected with a radio receiving circuit equipped with audion tubes of the alternating current or heater type. It is to be understood however, that my power supply device may be used to supply current to tubes or other devices used for any purpose whatsoever.

Referring now more in detail to my invention as illustrated in the accompanying drawing the power supply unit PS comprises an iron core transformer T having a primary winding 2 connected across a source of alternating current (not shown) by means of the conductors 3 and 4. Bridged across the conductors 3 and 4 are condensers 5 and 6, the center tap of which is connected to ground 7, and these condensers 5 and 6 drain disturbing noises which may come in over the alternating current leads 3 and 4. The transformer T is provided with a secondary winding 8 which supplies a step-down voltage to the heater elements of the audion tubes 9 and 10 of the receiving circuit RS over conductors 11 and 12 and a center tap 13 of the secondary winding 8 is grounded at ground 7.

A secondary winding 14 is connected through a variable resistance 15 to the filament or cathode 16 of the rectifier tube 17 and a pair of plates 18 and 19 associated with the filament 16 are connected to opposite terminals of a secondary winding 20 also associated with the primary winding 2. The central point or tap 21 of the secondary winding 20 is connected to ground 7 by means of a conductor 22 which forms the negative lead of the plate current supply. One terminal of the filament 16 of the rectifier tube 17 is connected at 23 to the positive supply lead 24.

A voltage control relay 25 is connected in series relation with the positive plate supply lead 24 and controls a normally closed contact 26. A load resistance 27 is normally bridged across the high voltage plate current conductors 22 and 24 through the normally closed contact 26 of the said control relay 25, and the purpose of the relay 25 in combination with the load resistance 27 and their operation in combination with the power supply unit PS will be more fully hereinafter described. The positive plate supply lead 24 is connected in series relation with a choke coil 28 and in combination with the condensers 29 and 30, which are bridged across the high voltage plate current leads 22 and 24, are for the usual filtering purposes. The plate current extends over conductor 24 to the plates of the audion tubes of the receiving circuit RS and by means of resistances, such as 31 and 32, plate currents of the correct values are delivered to the plates of the audion tubes.

Having described in general the apparatus comprising my invention I will now describe in detail the operation of the same. Current from the alternating current source is extended over the conductors 3 and 4 to the primary winding 2. Current from the primary winding 2 is induced into the secondary winding 8 and this step-down secondary winding 8 delivers current to the proper voltage over conductors 11 and 12 to the heater elements of the audion tubes 9 and 10 of the receiving circuit RS. The heater elements of the audion tubes 9 and 10 bring about the heating of the cathodes associated therewith but a short interval of time elapses between the time that current is applied to the heater elements of the audion tubes 9 and 10 and the time they reach an operating temperature so that a substantial flow of plate current extends across the cathodes and plates of the tubes 9 and 10.

The voltage control relay 25 is constructed to operate after the flow of plate current has reached a certain value but the current value at which the control relay 25 operates may vary depending upon the construction and design of the control relay 25 and the type of circuit with which the control relay 25 is associated. The voltage control relay 25 is connected serially with the positive plate supply lead 24 and the increased flow of plate current therethrough as the heater elements of the audion tubes 9 and 10 heat up will cause the relay 25 to operate, and the relay will remain operated as long as plate current is being used by the set.

As soon as the current flowing through relay 25 reaches the predetermined amount the relay 25 energizes to open its normally closed contact 26. The contact 26 of relay 25 when it is in its normal position is closed, maintaining the load resistance 27 bridged across the high voltage plate current leads 22 and 24. The resistance 27 holds the open circuit voltage down until plate current flows through the set which then retains the voltage of the plate current at its normal operating value.

It is readily apparent that the instant that a source of alternating current is connected to conductors 3 and 4 of the transformer T of the power supply unit PS, the winding 8 delivers current over conductors 11 and 12 to the heater elements of the audion tubes 9 and 10. Current from the secondary winding 14 is delivered to the filament 16 of the rectifier tube 17, and the secondary winding 20 in association with the rectifier tube 17 will deliver rectified high voltage plate current to the leads 22 and 24. The bridged load resistance 27 limits the voltage of the rectified plate current to protect the apparatus thereby preventing the flow of excessively high voltage current through the choke coil 28 and condensers 29 and 30 and the apparatus of the receiving circuit.

If there was no load normally across the leads 24 and 22 the instant current was applied thereto the voltage would rise excessively high as there would be substantially no plate current flow through the tubes until the cathodes thereof become electronically active. By controlling the application of the plate voltage as above described the choke coil and condensers and receiving circuit equipment are not subjected to surges of high voltage plate current each time the supply unit is operated. When the alternating current source is disconnected from the supply unit as by a suitable switch, the relay 25 deenergizes to again close its contact 26 to again bridge the load resistance across the leads 22 and 24.

While I have illustrated and described a specific circuit arrangement in association with my invention, other circuit arrangements different than that described may be used, and it is therefore my aim to cover all such changes and modifications as come within the spirit and scope of the appended claims.

Having described my invention, what I claim as new and desire to secure by United States Letters Patent is:—

1. The combination of a power supply device and an audion tube, of means in said power supply device for furnishing current to the cathode and anode of said tube, means for initially limiting the voltage of the anode current, and means for rendering said first means inoperative after a normal amount of current begins to flow between said anode and cathode.

2. The combination of a power supply device and an audion tube, of means in said power supply device for furnishing current to the cathode and anode of said tube, an artificial load for initially limiting the voltage of the anode current and means for removing the said artificial load at a predetermined time after current begins to flow through the said anode circuit.

3. The combination of a power supply device and an audion tube, of means in said power supply device for furnishing current to the cathode and anode of said tube, and an artificial load for initially limiting the voltage of the anode current until the operating load is connected in the anode circuit at which time the artificial load is removed from the circuit and held removed therefrom by the flow of current through the operating load.

4. The combination of a power supply device and an operating load which has a lag therein, an artificial load, means for connecting said artificial load to said power device and means for removing the said artificial load after a predetermined time.

5. The combination of a power supply device and an operating load, an artificial load, and means normally connecting said artificial load to said power device but operable to subsequently operatively connect said operating load to said power device.

6. The combination of a power supply device and an operating load, an artificial load, and means normally connecting said artificial load to said power device but operable to subsequently operatively connect said operating load to said power device and for disconnecting said artificial load from said power device when current is operatively connected to said power device.

7. The combination with a supply unit and a receiving circuit, of a voltage control device, heater type tubes for said receiving circuit, a relatively high voltage plate current delivered by said supply unit in series with said control device, a relatively low voltage current delivered by said supply unit for the heater elements of said tubes, said plate current effective subsequently to a predetermined heating of said heater elements to cause the operation of said control device, a load resistance, and means controlled by said control device for bridging said resistance across said supply leads during the initial operation of said heater elements.

8. The combination with a supply unit and a receiving circuit, of a voltage control relay, heater type of tubes for said receiving circuit, a high voltage plate current delivered by said supply unit in series with said control relay, a low voltage current delivered by said supply unit for the heater elements of said tubes, said plate current effective subsequently to a predetermined heating of said heater elements to cause the operation of said control relay when said plate current has reached a predetermined value, a load resistance, and means controlled by said control relay for bridging said resistance across the plate current leads of said supply unit during the initial heating of said heater elements.

9. The combination with a supply unit and a receiving circuit, of a voltage control relay, heater type tubes for said receiving circuit, a high voltage plate current delivered by said supply unit in series with said control relay, a low voltage current delivered by said supply unit for the heater elements of said tubes, said plate current effective subsequently to a predetermined heating of said heater elements to cause the operation of said relay, a load resistance, and means controlled by said control relay for bridging said resistance across said supply leads, said relay operating said means associated therewith to remove said bridged resistance subsequent to said predetermined heating of said heater elements.

10. The combination with a supply unit and a receiving circuit, of a voltage control relay, heater type tubes for said receiving circuit, a high voltage plate current delivered by said supply unit in series with said control relay, a low voltage current delivered by said supply unit for the heater elements of said tubes, said plate current effective subsequently to a predetermined heating of said heater elements to cause the operation of said relay, a load resistance, and means controlled by said relay for bridging said resistance across said supply leads to limit the voltage of said plate current passing through the filtering apparatus of said supply unit, said relay operating said means associated therewith to remove said bridged resistance subsequent to said predetermined heating of said heater elements.

11. The combination with a supply unit and a receiving circuit, of a control device, heater type tubes for said receiving circuit, a high voltage plate current delivered by said supply unit in series with said control device, a low voltage current delivered by said supply unit for the heater elements of said tubes, said plate current being ineffective until the heater elements of said tubes have heated sufficiently to cause the flow of plate current through said tubes and operating only after said plate current reaches a predetermined value, a load resistance, and means controlled by said control device for bridging said resistance across the plate current leads during the non-operating period of said control device to limit the voltage of said plate current which passes through the filtering apparatus of said supply unit.

12. The combination with a supply unit and a receiving circuit, of a control device, heater type tubes for said receiving circuit, a relatively high voltage plate current delivered by said supply unit in series with said control device, a relatively low voltage current delivered by said supply unit for the heater elements of said tubes, said plate current being ineffective until the heater elements of said tubes have heated sufficiently to cause the flow of plate current through said tubes, and operating only after said plate current reaches a predetermined value, a load resistance, and a switching contact controlled by said control device for bridging said resistance across said plate current leads during the non-operating period of said control device to limit the voltage of said plate current which passes through the filtering apparatus of said supply unit, said control device when operating opening said switching contact to remove said load resistance.

Signed by me at Chicago, in the county of Cook and State of Illinois, this 9th day of February, 1929.

GEORGE R. EATON.